United States Patent [19]
Steffes

[11] 3,788,336
[45] Jan. 29, 1974

[54] TENT STAKE

[75] Inventor: William J. Steffes, Wichita, Kans.

[73] Assignee: The Coleman Company, Inc., Wichita, Kans.

[22] Filed: July 28, 1971

[21] Appl. No.: 166,830

[52] U.S. Cl. ............................. 135/15 PE, 52/155
[51] Int. Cl. ............................................. A45f 1/16
[58] Field of Search .... 135/15 PE; 52/23, 103, 155, 52/156, 166; 24/130

[56] References Cited
UNITED STATES PATENTS

| 3,066,447 | 12/1962 | Reiterer et al. | 52/155 |
| 1,219,905 | 3/1917 | Barringer | 135/15 PE |
| 1,423,868 | 7/1922 | Monahan | 24/130 |
| 3,635,232 | 1/1972 | Rothesser | 135/15 PE |

FOREIGN PATENTS OR APPLICATIONS

| 96,685 | 9/1960 | Norway | 135/15 PE |
| 349,673 | 6/1937 | Italy | 135/15 PE |

*Primary Examiner*—Peter M. Caun
*Attorney, Agent, or Firm*—Dawson, Tilton, Fallon & Lungmus

[57] ABSTRACT

A tent stake is provided which may be advantageously molded integrally from plastic and which has good strength yet relatively small cross sectional area. The stake includes an elongated body formed by three longitudinally extending ribs which are spaced about 120° apart to provide a generally Y-shaped cross section. The ribs taper at one end of the body to form a ground-entering end, and the driving end of the stake terminates in a generally convex head. A hook is formed on one of the longitudinally extending ribs and extends angularly outwardly from the head toward the ground-entering end of the stake. If desired, a second hook spaced longitudinally from the first hook may be provided on the same longitudinally extending rib. The longitudinally extending rib from which the hook extends is strengthened by an outer end portion which extends perpendicularly to the outwardly extending portion of the rib, and the driving portion of the stake may be reinforced by reinforcing ribs which extend between the head and the longitudinally extending ribs.

9 Claims, 13 Drawing Figures

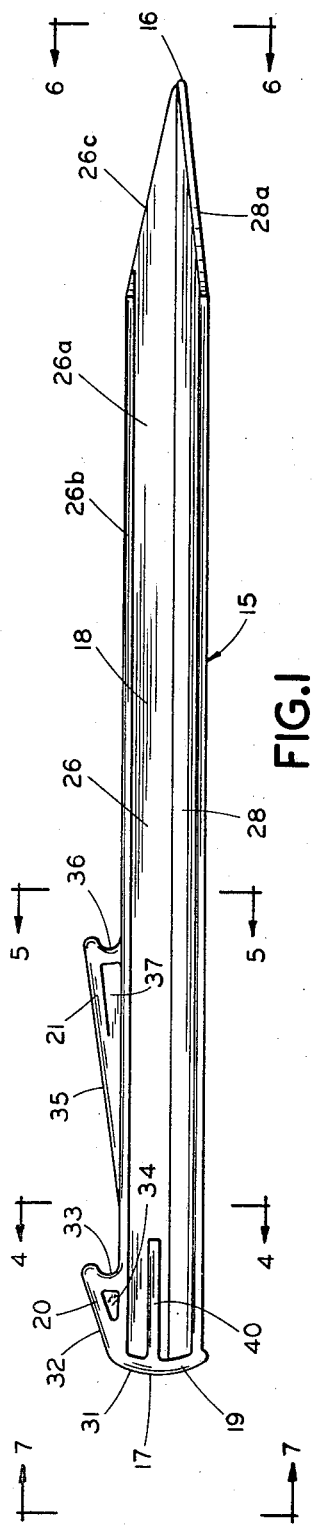
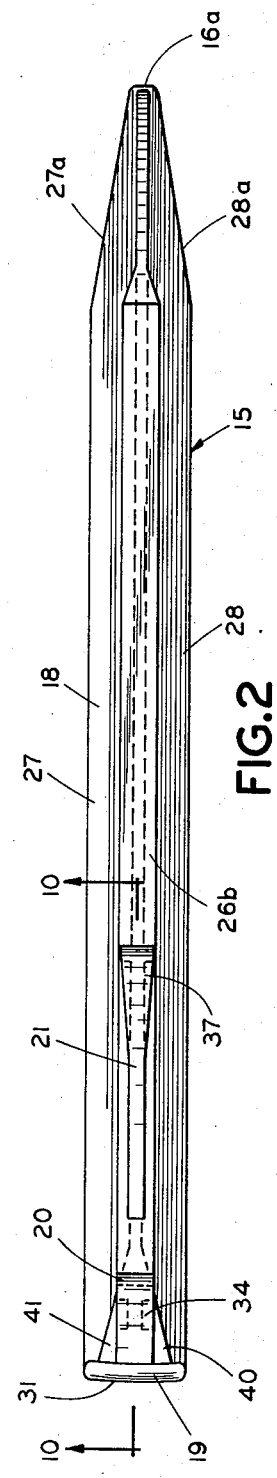
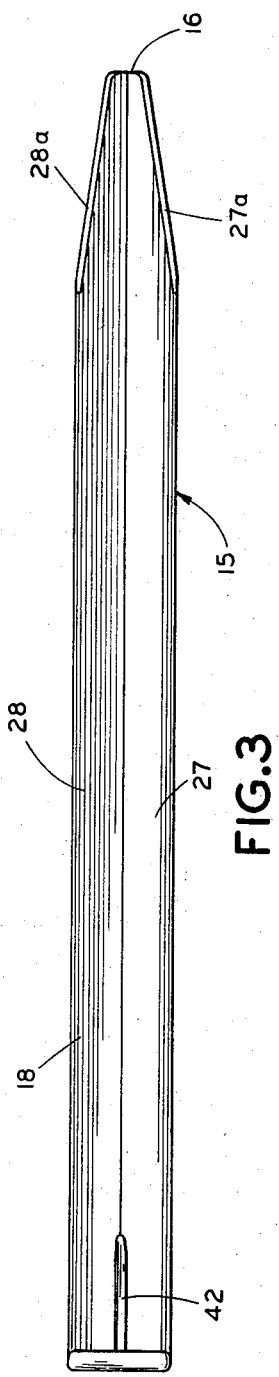

PATENTED JAN 29 1974 3,788,336
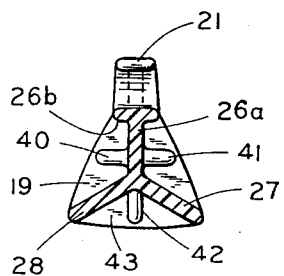
FIG.4
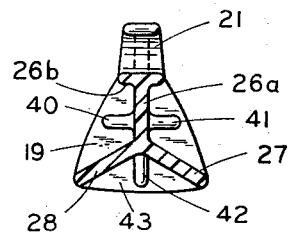
FIG.5
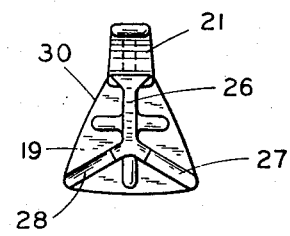
FIG.6
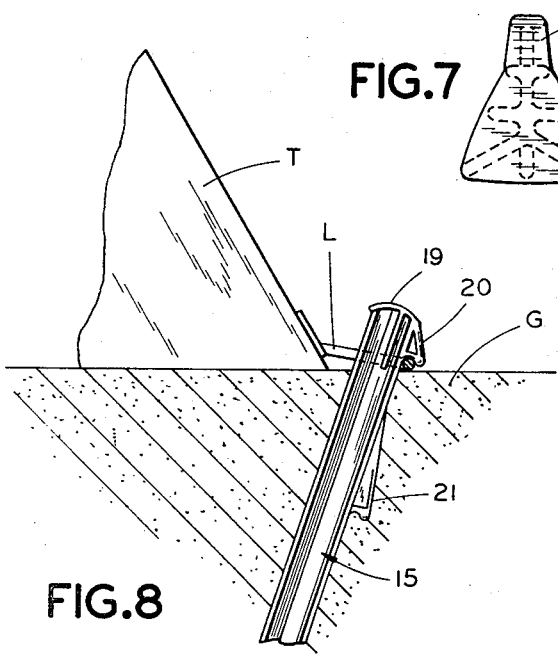
FIG.7
FIG.8
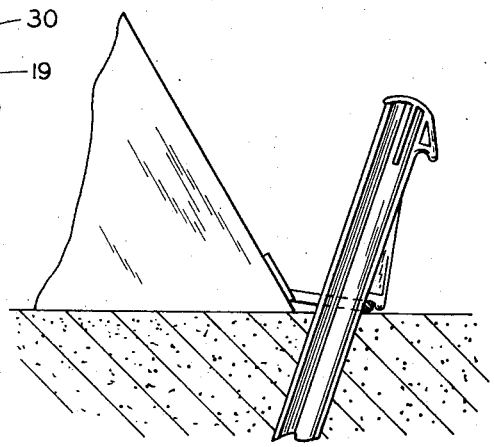
FIG.9
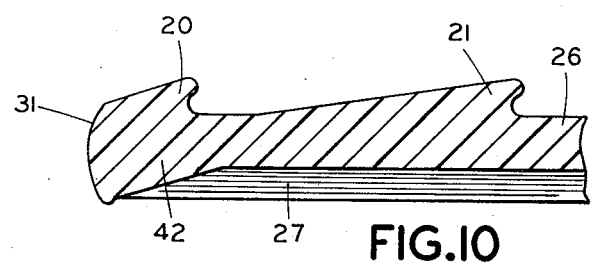
FIG.10
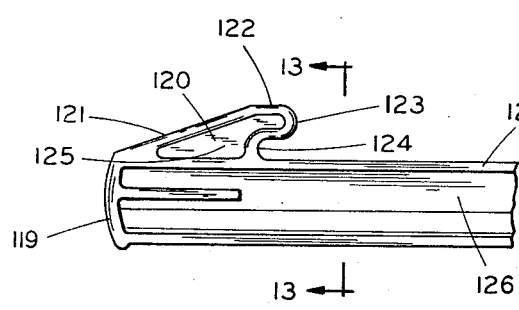
FIG.11
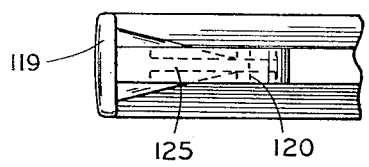
FIG.12
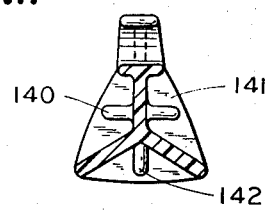
FIG.13

TENT STAKE

BACKGROUND

This application relates to tent stakes, and, more particularly, to a tent stake which may be molded integrally from plastic and which is characterized by good strength yet a relatively small cross sectional area.

One of the primary requisites for a tent stake is that the stake be relatively strong, i.e., have a high resistance to bending or buckling under the forces applied when the stake is being driven into the ground and the forces applied by the tent loop or ring. Resistance to bending or buckling is generally proportional to the moment of inertia of the stake, which is dependent upon the cross sectional area. Since forces which might be applied to the stake as it is being driven might be applied in any direction, it is desirable that the moment of inertia be high with respect to any axis perpendicular to the longitudinal axis or center line of the stake. However, increasing the cross sectional area of the stake generally increases the cost of the stake and also generally increases the amount of force required to drive the stake into the ground.

Accordingly, problems have arisen in designing tent stakes which have sufficient strength yet which require relatively low driving force and which may be manufactured economically.

SUMMARY

The invention provides a plastic tent stake having a relatively high moment of inertia with respect to any axis perpendicular to the longitudinal axis of the stake to provide good resistance to bending or buckling while having a relatively small cross section area compared to the moment of inertia. The relatively small cross sectional area not only minimizes the driving force required to drive the stake into the ground but also decreases the compressive load which the stake is required to withstand during driving. The driving force is further minimized by the fact that in any cross section of the stake no portion of the stake extends outwardly beyond a portion located at cross section closer to the driving end of the stake. The driving end of the stake is provided with a generally convex head which will allow driving blows which are not directed at the center of the stake to glance off the head without damaging the stake, and the head merges smoothly with the hook to permit blows directed at the hook to glance off and to eliminate any possibly hazardous protrusions on the end of the stake which extends above ground. The longitudinal rib which carries the hook is provided with an outer reinforcing rib portion which increases the moment of inertia about an axis perpendicular to the force applied by the tent loop and therefore increases the resistance to bending under this force. The Y-shaped cross section of the stake permits it to be withdrawn relatively easily from the ground while withdrawing a minimal amount of dirt. If desired, the stake can be provided with a second hook spaced below the first hook which can be used if the stake is being driven into hard ground and can be conveniently driven therein for only a portion of its length.

DESCRIPTION OF THE DRAWING

The invention will be explained in conjunction with an illustrative embodiment shown in the accompanying drawing, in which FIG. 1 is a longitudinal elevational view of a tent stake made in accordance with the invention;

FIG. 2 is a top plan view of the stake shown in FIG. 1;

FIG. 3 is a bottom plan view of the stake shown in FIG. 1;

FIG. 4 is a sectional view taken along the line 4—4 of FIG. 1;

FIG. 5 is a sectional view taken along the line 5—5 of FIG. 1;

FIG. 6 is an end view taken along the line 6—6 of FIG. 1;

FIG. 7 is an end view taken along the line 7—7 of FIG. 1;

FIG. 8 is a fragmentary view showing the stake securing a tent loop;

FIG. 9 is a view similar to FIG. 8 showing the tent loop being secured by the second hook;

FIG. 10 is a fragmentary sectional view taken along the line 10—10 of FIG. 2;

FIG. 11 is a longitudinal elevational view, partially broken away, of a modified tent stake formed in accordance with the invention;

FIG. 12 is a fragmentary top plan view of the stake shown in FIG. 11; and

FIG. 13 is a sectional view taken along the line 13—13 of FIG. 11.

DESCRIPTION OF SPECIFIC EMBODIMENT

Referring now to FIGS. 1–3, the numeral 15 designates generally a tent stake which includes a forward or ground-entering end 16 and a driving or top end 17. The stake includes an elongated body 18, a head 19 at the driving end, and a pair of hooks 20 and 21 which extend outwardly from the body for holding the tent loops or rings.

As can be seen best in FIGS. 4–6, the body 18 has a generally Y-shaped cross section which is provided by three longitudinally extending ribs 26, 27 and 28. The ribs extend outwardly from the longitudinal axis of the body and are spaced about 120° apart around the longitudinal axis. The ribs 27 and 28 are generally planar, but the rib 26 is seen to have a generally T-shaped cross section which is provided by a first planar portion 26a which extends outwardly from the intersection of the ribs 26–28 and an outer rib portion 26b which extends perpendicularly to the outwardly extending portion 26a.

The forward portions of the ribs 26–28 taper toward the longitudinal axis of the stake to provide the relatively pointed ground-entering end 16. The rib 26 includes an inclined forward edge portion 26c, and the ribs 27 and 28 include inclined forward edge portions 27a and 28a, respectively. The outer perpendicular rib portion 26b of the rib 26 terminates adjacent the rear portion of the inclined edge 26c. Comparing FIGS. 1 and 2, the inclined edges 27a and 28a may taper at a slightly smaller angle relative to the longitudinal axis than the edge 26c to provide a somewhat blunt nose 16a to reduce the possibility of injury.

The head 19 includes a generally triangular outer edge 30 (FIGS. 6 and 7) which extends between the outer ends of adjacent longitudinally extending ribs, and the head is seen to have a substantially greater cross-sectional area than the Y-shaped body 18 to provide a substantial area for driving the stake. The head includes a generally convex top surface 31 (FIGS. 1 and 2) which curves toward the ground-entering end of the stake, and the radius of curvature of the top surface is seen to be greater in a plane which extends parallel to the rib 26 and the hooks 20 and 21 (FIG. 1) than in a plane which extends perpendicular thereto (FIG. 2).

The hook 20 is generally triangular in longitudinal cross section and includes an inclined side edge 32 which merges smoothly with the arcuate top surface 31 and extends outwardly and forwardly therefrom. An arcuate holding edge 33 curves inwardly from the side edge 32 to the rib 26. The hook 20 has a maximum width substantially the same as the width of the perpendicular rib portion 26b but is provided with a central web portion 34 of reduced thickness.

The hook 21 is similarly formed and includes an inclined side edge 35, an arcuate holding edge 36, and a central web portion 37. The inclined side edge 35 extends outwardly from the rib portion 26b at a point spaced forwardly from the hook 20 and extends at a more acute angle than the side edge 32 of the hook 20. The maximum distance which the hook 21 extends from the rib 26 is no greater than the maximum distance which the hook 20 extends therefrom, and in the particular embodiment illustrated, both hooks extend outwardly at equal distance. The holding edge 36 and the forward end of the side edge 35 have a thickness slightly less than the thickness of the rib portion 26b, and the width of the edge 35 gradually tapers rearwardly until it equals the width of the web portion 37.

The head and the driving end portion of the stake are further reinforced by three reinforcing ribs 40, 41 and 42. Each of the reinforcing ribs is seen to be generally triangularly shaped and extends forwardly and inwardly from adjacent the outer periphery of the head 19. The ribs 40 and 41 interconnect the bottom surface 43 of the head with opposite sides of the planar portion 26a of the rib 26, and the rib 42 interconnects the bottom surface of the head with the junction between the ribs 27 and 28. The ribs 40-42 are of substantially equal length and extend forwardly slightly beyond the hook 20.

The stake 15 can be injection molded integrally from suitable plastic such as ABS, high impact styrene, fiberglass reinforced ABS, and fiberglass reinforced high impact styrene. The portion of the mold which forms the portion of the stake containing the second hook 21 may be a removable mold section to permit molding a stake identical to the stake 15 but without the hook 21. The removable mold section can either be replaced by a similar section without a hook-forming cavity to form a single-hook stake of the same length as the stake 15, or the mold sections adjacent the removable mold section can be brought together to form a shorter stake. For example, the stake 15 may advantageously have a length of 12 inches, and the mold section for molding the hook 21 may be three inches long. A nine inch stake having a single hook 20 could therefore be formed by removing the mold section.

A modified stake 115 which includes only a single hook 120 is shown in FIGS. 11–13. The stakes 115 includes a Y-shaped body 118 and head 119 which are identical to the body 18 and head 19, respectively, of stake 15, and the body and head are similarly reinforced by reinforcing ribs 140, 141, and 142.

The hook 120 is somewhat larger and stronger than the hook 20 and includes an inclined side edge 121 which merges smoothly with the curved top surface of the head 119 and which extends outwardly and forwardly therefrom and a longitudinally extending outer edge 122. The outer edge 122 terminates in a curved or arcuate forward edge 123, and a reversely curved arcuate holding edge 124 extends between the forward edge 123 and the body. The width of each of the edges 121–124 is substantially the same as the width of the perpendicular rib portion 126b of the rib 126, and the hook includes a central web portion 125 of reduced thickness.

In one specific embodiment of the stake 15, the stake was 12 inches long and the tapered ground-entering end formed by the inclined edges 26c, 27a, and 28a was two inches long. The inclined edge 32 of the first hook 20 extended for a distance of ⅞ inch along the longitudinal axis of the stake, and the inclined side edge 35 of the second hook extended for a distance of two inches along the longitudinal axis. The arcuate holding edges of each of the hooks had a radius of curvature of ⅛ inch. The radius of curvature of the convex head 19 in a plane parallel to the hooks 20 and 21 (FIG. 1) was 11/16 inch, and the radius of curvature of this surface in a plane perpendicular to the first plane was 4⅜ inches. The thickness of the ribs 26a, 26b, 27, 28 and the reinforcing ribs 40–42 was 0.1 inch, and the transverse dimension of the rib 26b was 5/16 inch.

In specific embodiments of the stake 115, the body and head thereof had corresponding dimensions, except that the body was formed in both 12 inch and nine inch lengths. However, the inclined side edge 121 extended for a length of 1 3/32 inches along the longitudinal axis, and the straight outer edge 122 extended for an additional 5/16 inch. The radius of curvature of the curved forward edge 123 was 3/16 inch, and the radius of curvature of the holding edge 124 was ⅛ inch.

Referring now to FIG. 8, the stake 15 is used by inserting the pointed end thereof through the conventional anchoring loops or rings indicated at L and which are secured to a tent T. The stake is driven into the ground G at an angle relative to the vertical with the pointed end of the stake pointing toward the tent. The relatively small cross sectional area of the Y-shaped body permits the stake to be driven into the ground with a relatively low driving force, and the curved head 19 and the inclined edge 32 of the hook 20 permit blows which are not directed properly to glance off the stake rather than hitting the stake solidly which might result in damage. Referring to FIG. 6, it is seen that no part of the stake projects outwardly beyond any part which is located forwardly thereof, and this also minimizes the amount of driving force required.

If the stake is to be driven into the ground for substantially its entire length, the loop is passed around the second hook 21, and the stake is driven downwardly until the loop L is engaged by the holding edge 33 of the hook 20. The Y-shaped cross section of the stake provides a substantial moment of inertia with respect to any axis perpendicular to the longitudinal axis of the stake, and the stake therefore has good resistance to bending or buckling as it is driven into the ground.

When the stake is fully driven into the ground as shown in FIG. 8, the rounded head 19 and the smoothly merging inclined edge of the hook 20 which protrude above the ground minimize the possibility of injury to campers. The pulling force exerted on the stake by the tent loop is directed away from the rib 26, and the stake is provided with good holding power against this force by virtue of the somewhat concave surface provided by the angularly related ribs 27 and 28. Further resistance to bending under the force applied by the tent loop is provided by the perpendicular rib portion 26b, which increases the moment of the inertia of the stake about an axis perpendicular to the direction in which the force is applied.

If the stake is being driven into hard or frozen ground, it may be desirable to drive the stake for only a portion of its length as illustrated in FIG. 9. In this event, the lower hook 21 is used to secure the tent loop. If the lower hook is driven into the ground, the vulnerability of this hook to breakage is reduced by the tapering width of the inclined side edge 35 (see FIG. 2) which provides a smooth transmission of static and shock loads from the hook to the body.

Although the stake provides a firm anchor for the tent loop, the stake can be easily removed from the ground when desired by virtue of the Y-shaped cross section in which the longitudinally extending ribs are spaced 120° apart. Not only is the stake easy to remove, but the wide separation between the ribs helps to insure that a minimal amount of dirt will cling to the stake as it is removed.

From the foregoing, it is seen that a tent stake with a relatively high moment of inertia compared to its cross sectional area can be economically manufactured. The tent stake is strong yet relatively easy to drive into and remove from the ground.

While in the foregoing specification, specific embodiments of the invention were set forth in considerable detail for the purpose of illustration, it is to be understood that many of the details herein given may be varied considerably by those skilled in the art without departing from the spirit and scope of the invention.

I claim:

1. A tent stake comprising an elongated body having a driving end and a ground-entering end, the body including three longitudinally extending ribs extending outwardly from the longitudinal axis of the body portion to provide the body with a generally Y-shaped cross section, the longitudinally extending ribs tapering toward the longitudinal axis adjacent the ground-entering end to provide a relatively pointed ground-entering end, a head on the driving end of the body extending generally perpendicularly to the longitudinal axis of the body and having a greater cross sectional area than the cross sectional area of the body, the head having a generally arcuate top surface curving toward the ground-entering end of the body, one of the longitudinally extending ribs including a generally planar first portion extending outwardly from the longitudinal axis of the body and a second portion extending generally perpendicularly to the first portion at the outer end thereof to provide said one longitudinally extending rib with a generally T-shaped transverse cross section, the second portion extending longitudinally from the driving end of the body and terminating short of the tapered portion of said one longitudinal rib, and a hook extending outwardly from said second portion of said one longitudinally extending rib, the hook including a side portion extending from the arcuate top surface of the head angularly outwardly and toward the ground-entering end and a holding portion extending from the side portion to said second portion of said one longitudinally extending rib.

2. The tent stake of claim 1 including a second hook spaced longitudinally from the first hook toward the ground-entering end of the body and extending outwardly from said second portion of said one longitudinally extending rib, the second hook including a side portion extending from said second portion angularly outwardly and toward the ground-entering end and a holding portion extending from the side portion toward said second portion.

3. The tent stake of claim 2 in which the distance which the second hook extends outwardly from said one longitudinally extending rib is no greater than the distance which the first hook extends outwardly from said one longitudinally extending rib.

4. The tent stake of claim 1 in which the arcuate surface of the head is generally convex and curves toward the ground-entering end of the body, the radius of curvature of the top surface in a plane parallel to said one longitudinally rib being greater than the radius of curvature in a plane perpendicular to said one longitudinally extending rib.

5. The tent stake of claim 1 in which the hook includes a central web portion having a thickness less than the thickness of the remainder of the hook.

6. The tent stake of claim 1 in which the holding portion of the hook extends arcuately toward the driving end of the body.

7. The tent stake of claim 1 in which the longitudinally extending ribs are spaced about 120° apart around the longitudinal axis of the body.

8. The tent stake of claim 1 including a pair of reinforcing ribs on opposite sides of said one longitudinally extending rib extending between the head and said one longitudinally extending rib and a third reinforcing rib between the other two longitudinally extending ribs extending between the head and the other two longitudinally extending ribs, the reinforcing ribs extending from the head angularly inwardly and toward the ground-entering end of the body.

9. The tent stake of claim 8 in which the head has a generally triangular outer periphery which extends between the outer ends of adjacent longitudinally extending ribs and the reinforcing ribs are generally triangular and extend angularly inwardly toward the longitudinal axis of the body from adjacent the outer periphery of the head.

* * * * *